(12) United States Patent
Corridori

(10) Patent No.: US 6,193,322 B1
(45) Date of Patent: Feb. 27, 2001

(54) AERODYNAMIC WHEEL

(76) Inventor: Umberto Corridori, 1916 Norfolk, Apartment 8, Houston, TX (US) 77098

( * ) Notice: Subject to any disclaimer, the term of this patent is extended or adjusted under 35 U.S.C. 154(b) by 0 days.

(21) Appl. No.: 09/376,869

(22) Filed: Aug. 18, 1999

(51) Int. Cl.$^7$ .................................................. B60B 1/06
(52) U.S. Cl. .......................................................... 301/80
(58) Field of Search ............................... 301/6.3, 104, 54, 301/79, 80, 64.7; D12/204, 209, 210, 211, 206

(56) References Cited

U.S. PATENT DOCUMENTS

| | | | |
|---|---|---|---|
| D. 368,464 | * 4/1996 | Morley et al. | D12/205 |
| D. 368,885 | * 4/1996 | Wagner | D12/209 |
| D. 397,663 | * 9/1998 | Chrysanto | D12/209 |
| D. 407,054 | * 3/1999 | Kelley | D12/209 |
| D. 412,692 | * 8/1999 | Hussaini | D12/209 |
| D. 416,844 | * 11/1999 | Neeper | D12/209 |
| D. 424,501 | * 5/2000 | Hussaini et al. | D12/209 |
| D. 427,555 | * 7/2000 | Hall | D12/209 |
| D. 428,845 | * 8/2000 | Yoshida et al. | D12/211 |
| 4,919,490 | 4/1990 | Hopkins et al. . | |
| 4,930,844 | * 6/1990 | Giroux | 301/104 |
| 4,995,675 | * 2/1991 | Tsai | 301/104 |
| 5,104,199 | 4/1992 | Schlanger . | |
| 5,246,275 | 9/1993 | Arredondo, Jr. . | |
| 5,540,485 | 7/1996 | Enders . | |
| 5,603,553 | 2/1997 | Klieber . | |

FOREIGN PATENT DOCUMENTS

405077602 * 3/1993 (JP) ..................................... 301/64.7

* cited by examiner

*Primary Examiner*—S. Joseph Morano
*Assistant Examiner*—Long Bao Nguyen
(74) *Attorney, Agent, or Firm*—Michael B. Jolly

(57) ABSTRACT

An aerodynamic wheel, suitable for bicycles, which includes a central hub, a rim and a plurality of spoke members extending between the rim and the central hub, each spoke includes a leading edge and two trailing edges with air deflecting walls extending between each trailing edge and the leading edge. A cross sectional profile of each spoke about mid way between each end resembles a "V" with a centrally located trailing edge cavity positioned between the air deflecting walls and behind the leading edge. The wheel and spokes are installed for rotation with the leading edge of each spoke forward so that as the wheel rotates the leading edge, air deflecting walls and centrally located trailing edge cavity create a drafting effect for the following spoke leading edge thereby reducing aerodynamic drag and effort required for rotating the wheel. The wheel may be designed with at least three spokes while the hub, rim and spokes may be manufactured as a single component or as separate components.

2 Claims, 8 Drawing Sheets

Figure 4a
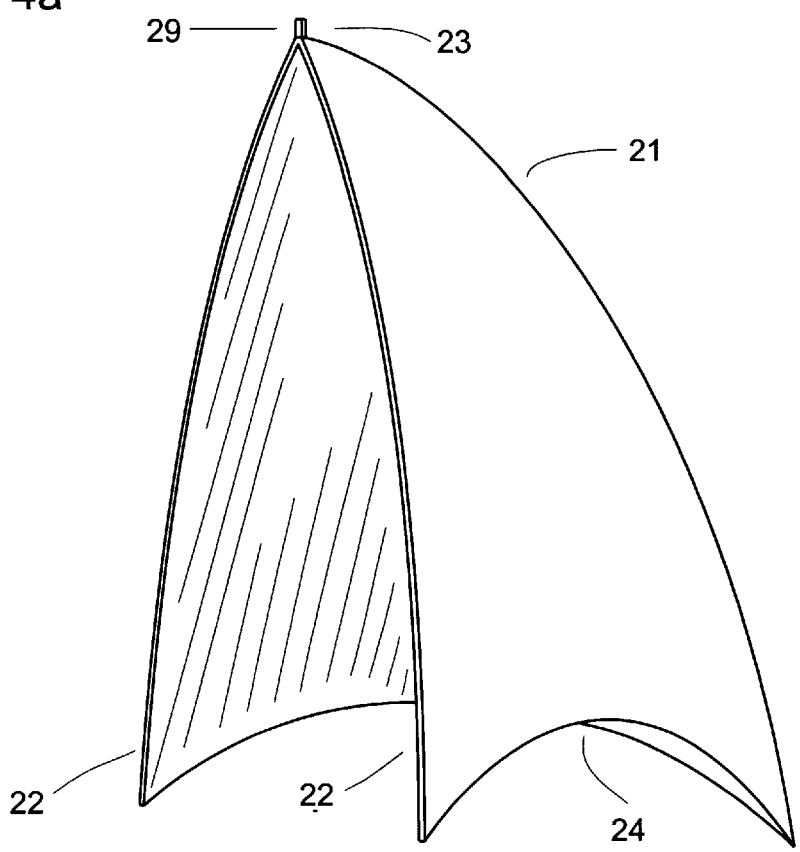
Figure 4b  Figure 4c
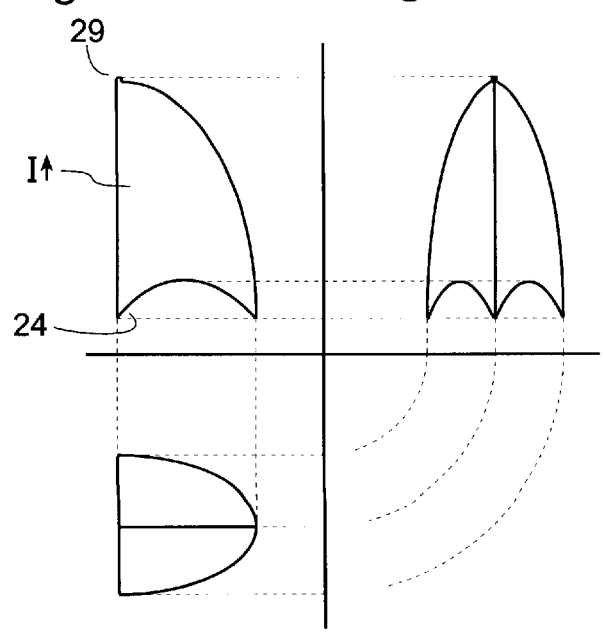 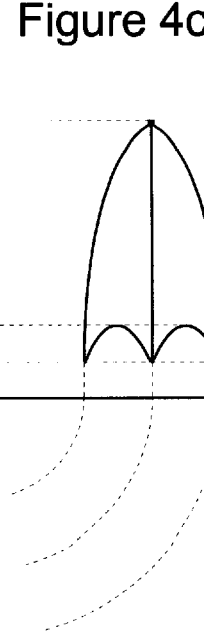 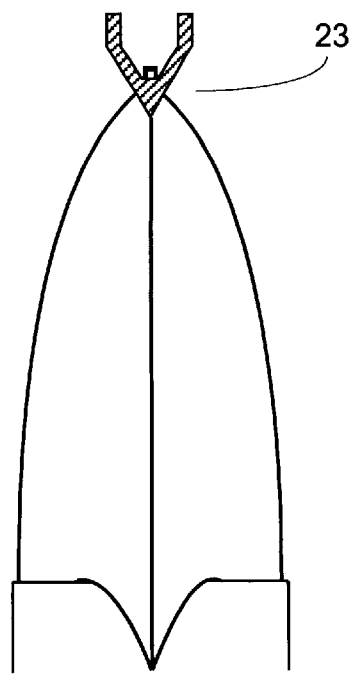
Figure 4d  Figure 4e Figure 5a
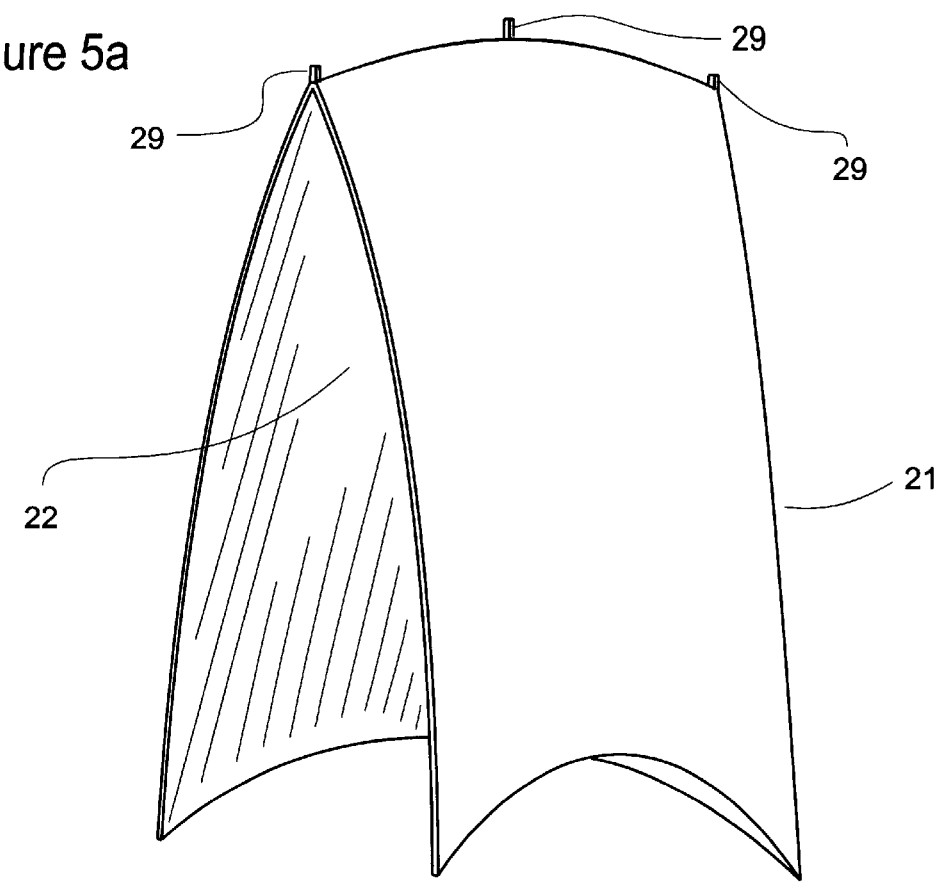
Figure 5b
Figure 5c
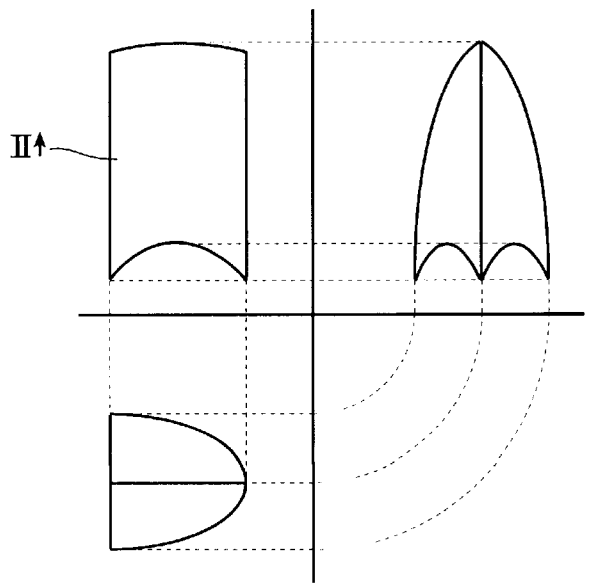
Figure 5d
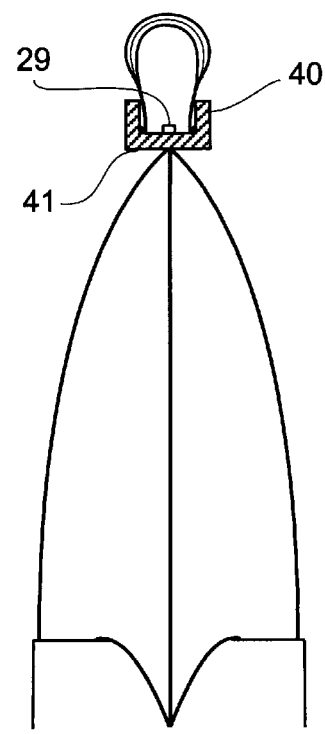
Figure 5e

A.

B.

Figure 7a
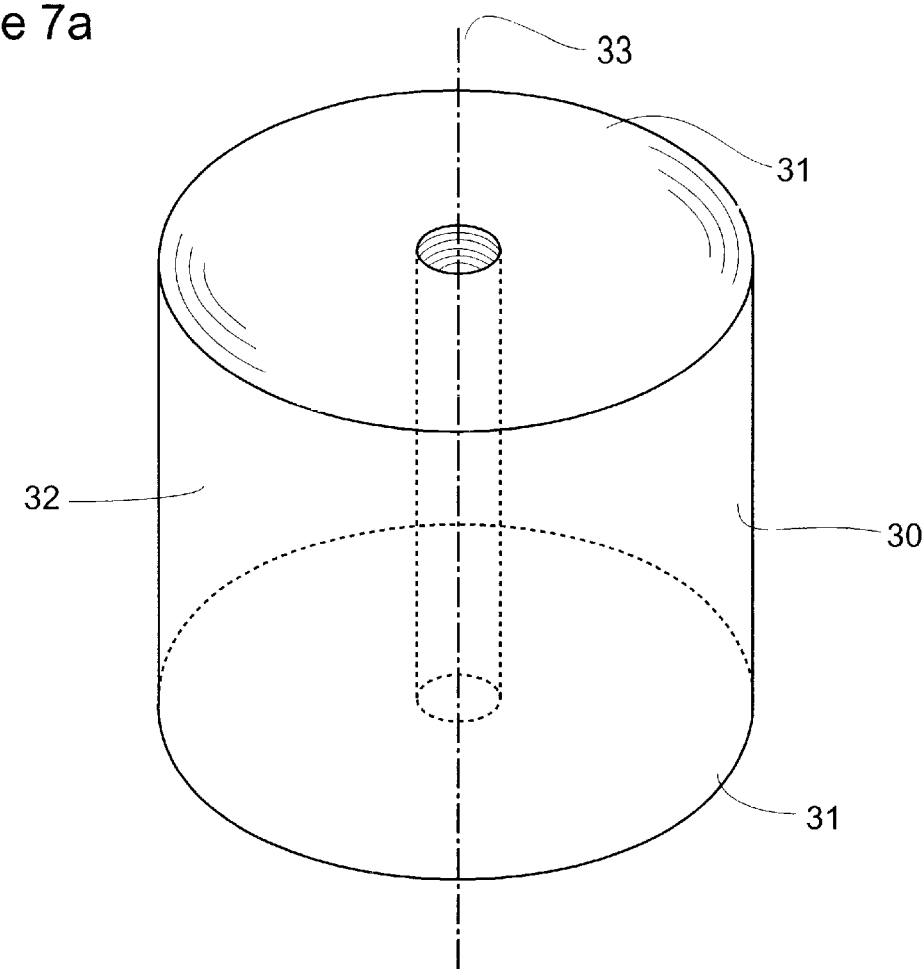
Figure 7b
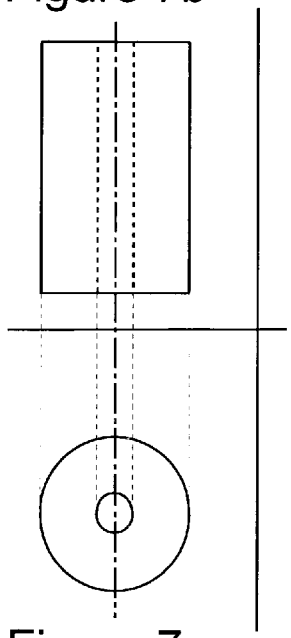
Figure 7c

Test Wheel Traditional

Galveston, Texas, Apr. 28 - 1999

| M.P.H. Vehicle speed | m.p.h. 5sec | m.p.h 10sec | m.p.h 15sec | m.p.h 20sec | m.p.h 25sec | m.p.h 30sec | m.p.h 35sec | m.p.h 40sec | m.p.h 45sec | m.p.h 50sec |
|---|---|---|---|---|---|---|---|---|---|---|
| V. Speed 10 | 10.5 | 6.5 | 5 | 3.5 | 2.5 | 1.5 | 0 | 0 | 0 | 0 |
| 15 | 10.5 | 6.5 | 4.5 | 2.5 | 1 | 0 | 0 | 0 | 0 | 0 |
| 20 | 11.5 | 7.5 | 4.5 | 2.5 | 0 | 0 | 0 | 0 | 0 | 0 |
| 25 | 9.5 | 5.5 | 3.5 | 2 | 0 | 0 | 0 | 0 | 0 | 0 |
| 30 | 8.5 | 4.5 | 3.5 | 2 | 0 | 0 | 0 | 0 | 0 | 0 |
| 35 | 9.5 | 5.5 | 3.5 | 0 | 0 | 0 | 0 | 0 | 0 | 0 |
| 40 | 9 | 6 | 3.5 | 0 | 0 | 0 | 0 | 0 | 0 | 0 |

Figure 8

Test Wheel Aereo

Galveston, Texas, Apr. 28 - 1999

| M.P.H. Vehicle speed | m.p.h. 5sec | m.p.h 10sec | m.p.h 15sec | m.p.h 20sec | m.p.h 25sec | m.p.h 30sec | m.p.h 35sec | m.p.h 40sec | m.p.h 45sec | m.p.h 50sec |
|---|---|---|---|---|---|---|---|---|---|---|
| V. Speed 10 | 10 | 7 | 5 | 4.5 | 5 | 3.5 | 3 | 2 | 0 | 0 |
| 15 | 10.5 | 8.5 | 8 | 8.5 | 7.5 | 7.5 | 6.5 | 6.5 | 7 | 7 |
| 20 | 11 | 11 | 10.5 | 10 | 10 | 10 | 10.5 | 10.5 | 11.5 | 11.5 |
| 25 | 14.5 | 14.5 | 15 | 15 | 15 | 14.5 | 15.5 | 15.5 | 15 | 15.5 |
| 30 | 15 | 15.5 | 15.5 | 15.5 | 16 | 16 | 16.5 | 16 | 16.5 | 17 |
| 35 | 16.5 | 18 | 18.5 | 18 | 18 | 17 | 17.5 | 17.5 | 18 | 19 |
| 40 | 16.5 | 18 | 19.5 | 19.5 | 21.5 | 20.5 | 20 | 20 | 20 | 22 |

Figure 9

AERODYNAMIC WHEEL

TECHNICAL FIELD

The present invention relates to wheels and more particularly to an aerodynamic bicycle wheel which exhibits reduced aerodynamic drag.

BACKGROUND ART

Bicyclist continually pondered designs and alterations of their cycles and components to increase efficiency and reduce effort. Along this line of thought alternative bicycle wheels have been patented and built which are designed to decrease aerodynamic drag experienced by rotation of a conventional spoke wheel. The prior art includes a number of alternatives to standard spokes wheels for this purpose, the following patents are good examples of the prior art:

Arrendondo, Jr., U.S. Pat. No. 5,246,275
Klieber at al., U.S. Pat. No. 5,603,553
Enders, U.S. Pat. No. 5,540,485
Schlanger, U.S. Pat. No. 5,104,199
Hopkins et al., U.S. Pat. No. 4,919,490

Various problems have been overcome by the prior devices, such as reducing aerodynamic drag, increasing lateral and torsional stability, decreasing cross wind problems and manufacturing methods. Although the prior art patents are extremely useful for their stated purposes, there has never been a bicycle wheel as the present which decreases aerodynamic drag, decreases the "sail effect" experience by cross winds, is light weight in construction, easily manufactured using known manufacturing processes, and further increases rotational efficiency.

The present invention includes a central hub section and a rim with a plurality of spoke members extending between the rim and the central hub, each spoke includes a leading edge and two trailing edges with air deflecting walls extending between each trailing edge and the leading edge. The spokes have equal shapes and dimensions and are evenly spaced in intervals radially about the central hub and rim. A cross sectional profile of each spoke about mid way between each end resembles a "V" with a centrally located trailing edge cavity positioned between each trailing edge and behind the leading edge. The wheel and spokes are installed for rotation with the leading edge of each spoke forward so that as the wheel rotates the leading edge, air deflecting walls and centrally located trailing edge cavity create a drafting effect for the following spoke leading edge. Accordingly, each spoke drafts the spoke immediately forward by a low pressure formed around the centrally located trailing edge cavity thereby reducing the effort for each succeeding spoke. The spoke drafting is similar to cyclists drafting each other during long distance racing. The difficulty encountered with cross winds is not experienced in the present invention and the present invention considerably increases rotation efficiency as will be shown below by the rotational experimental data comparing the present invention to traditional spoke wheel rotation efficiency. The spokes, hub, and rim may be integrally formed from the same material or may be manufactured as separate components.

GENERAL SUMMARY DISCUSSION OF INVENTION

It is thus an object of the present invention to provide a bicycle wheel which increases rotational efficiency, reduces aerodynamic drag, does not exhibit cross wind stability problems and further is easily adapted to any bicycle.

It is a further object of the present invention to provide an aerodynamic wheel with at least three spokes each of which are aerodynamically shaped to create a drafting effect for the following spoke.

It is a further object of the invention to provide an extremely efficient bicycle wheel which is easily manufactured using known manufacturing methods and which may be manufactured with the hub, spokes and rim as a single component or as separate components.

It is a still further object of the invention to provide a lightweight bicycle wheel which is easily manufactured and which increases rotational efficiency and which reduces effort.

It is a further object of the present invention to provide an aerodynamic wheel which includes a plurality of spoke members that are equally radially spaced about and extend between a rim and a central hub wherein each spoke includes a rim connecting end mounting the spoke to an inner surface of the rim and a hub connecting end radiused to mate with and mount to the central hub, each spoke includes a leading edge extending tangentially from the central hub in a direction opposite the rotational direction of the wheel and perpendicularly from an axis of the central hub and further mounted mid way between outside edges of the central hub and the leading edge extends to the rim connecting end, each spoke also includes two trailing edges each extending tangentially from the central hub in a direction of rotation of the wheel and opposing the leading edge and perpendicular from an axis of the central hub and further each trailing edge is mounted near opposing outside edges of the central hub and the trailing edges extend to the rim connecting end, air deflecting walls extend from each trailing edge to the leading edge forming a spoke with a cross section about mid way between the spoke ends which resembles a "V".

It is a further object of the present invention to provide an aerodynamic wheel with spokes as set forth above and wherein the leading and trailing edges are parallel with a plane along an axis of the central hub.

It is a further object of the present invention to provide an aerodynamic wheel with spokes as set forth above and wherein the trailing edges are parallel with a plane along an axis of the central hub and the leading edge arcs from the central hub to the rim connecting end so that the trailing edge rim connecting ends and the leading edge rim connecting end are joined.

Accordingly, an aerodynamic bicycle wheel is disclosed which includes a central hub section and a rim with a plurality of spoke members extending between the rim and the central hub, each spoke includes a leading edge and two trailing edges with air deflecting walls extending between each trailing edge and the leading edge. The spokes are evenly spaced in intervals radially about the central hub and rim and each spoke has a cross sectional profile which resembles a "V" with a trailing edge cavity positioned between the air deflecting walls and behind the leading edge. A low pressure is created in the trailing edge cavity as each spoke moves through air providing a drafting effect for the following spoke thereby reducing effort needed to move the rotating wheel and spokes through air. The spokes' shape allows them work for each other providing a net effect of reducing rotational effort.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 4a is a prospective view of a single spoke.

FIG. 4b is a side view of a single spoke.

FIG. 4c is a front view of a single spoke.

FIG. 4d is a top view of a single spoke.

FIG. 4e is a close-up view of a top end of a single spoke illustrating the mating of the spoke with a rim.

FIG. 5a is a prospective view of a single spoke of an alternative shape.

FIG. 5b is a side view of a single spoke for the alternative shape.

FIG. 5c is a front view of a single spoke for the alternative shape.

FIG. 5d is a top view of a single spoke for the alternative shape.

FIG. 5e is a close-up view of a top end of a single spoke illustrating the mating of the spoke with a rim for the alternative shape.

FIG. 7a is a prospective view of the central hub portion.

FIG. 7b is a side view of the central hub.

FIG. 7c is an end view of the central hub.

FIG. 8 are rotational speed test results for a traditional spoke wheel recording the wheel's rotational speed at five second periods while exposed to various wind speeds.

FIG. 9 are rotational speed test results for the aerodynamic bicycle wheel recording the wheel's rotation speed at five second periods while exposed to various wind speeds.

EXEMPLARY MODE FOR CARRYING OUT THE INVENTION

It can be seen from the following description that the aerodynamic wheel is particularly useful for bicycles but may also be adapted for use on other vehicles or machinery which would benefit from increasing rotational efficiency of a rotating wheel.

Figure 1:
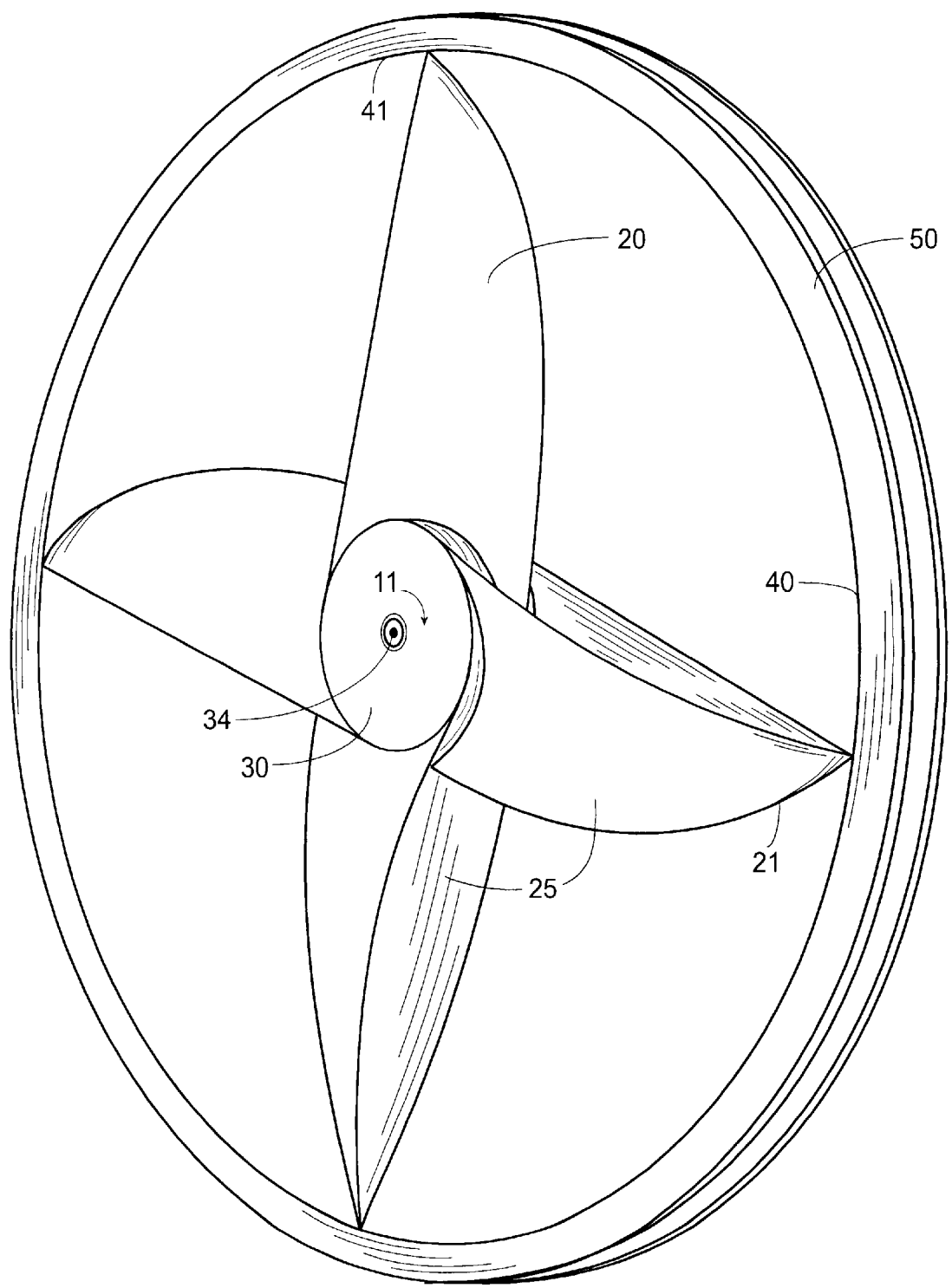
FIG. 1 is a prospective view of the aerodynamic bicycle wheel with four spokes.

Referring to the figures in detail FIG. 1 is a prospective view illustrating the aerodynamic bicycle wheel 10 with four spokes 20, a central hub 30, a rim 40 fitted with a tire 50. Although the figures illustrate the aerodynamic wheel with four spokes the wheel may include as few as three spokes and up to 15 spokes. As will be seen the aerodynamic spokes are the main feature of the present invention. Each spoke 20 creates a drafting effect for the following spoke resulting in an overall effect of increasing rotational efficiency. The prior art spokes which are designed to increase rotational efficiency are shaped similar to an airplane wing while each spoke must efficiently move through air requiring each spoke to independently contend with the forces of air exposed to the rotating wheel. The present invention allows the spokes of the rotating wheel to work for each other, similar to bicyclist drafting each other. Each spoke includes a leading edge 21, two trailing edges 22, a rim connecting end 23, a hub connecting end 24, and two air deflecting walls 25. The central hub 30 is in the general shape of a right cylinder with two parallel outside edges 31, an outer surface 32 for mounting the spokes, a rotational axis 33, and a mounting axle 34. A cross section of the central hub may be shaped circular as disclosed in FIG. 7c and may also be any other shape including a pentagon, hexagon, heptagon, octagon, nanogon, decagon, undecagon, dodecagon and shapes with additional sides. The distance between the two outside edges 31 should be about equal to the distance between mounting forks of the bicycle to which the wheel will be mounted. The diameter of a cross section of the central hub should be about equal to the distance 35 between the two outside edges of the central hub.

Figure 6:
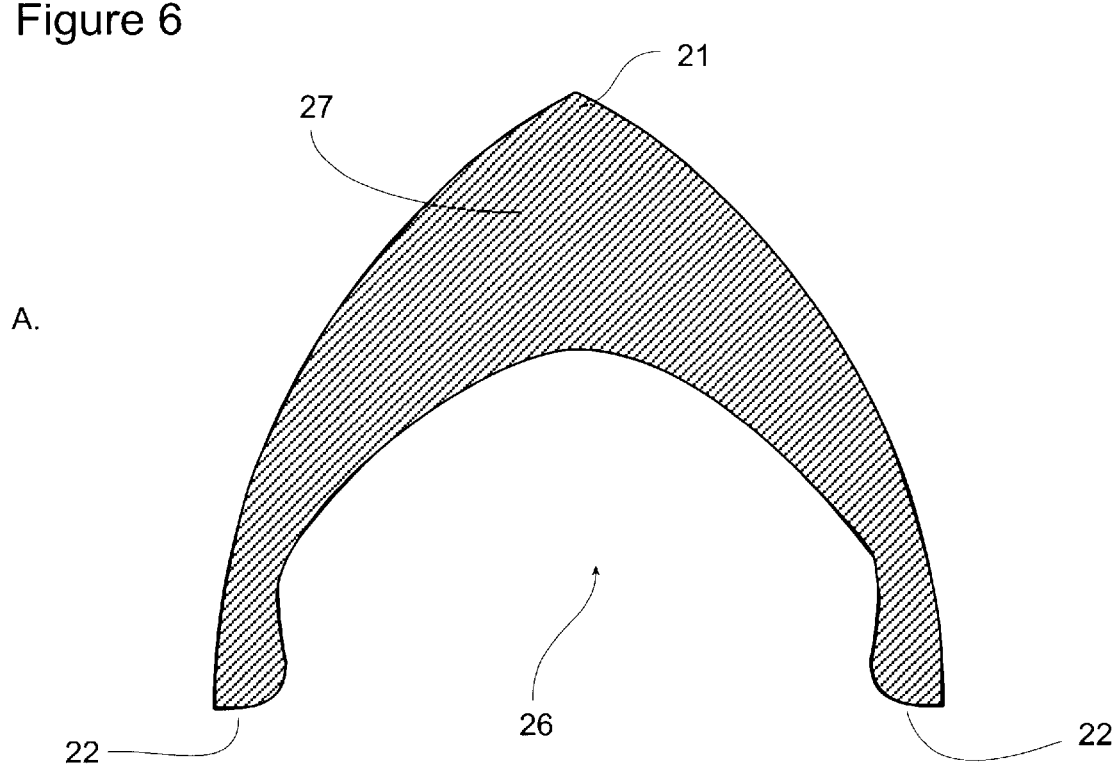
FIGS. 6a–b are cross sectional views of a single spoke taken along either line I or II of FIGS. 4b or 5b.
Figure 6:
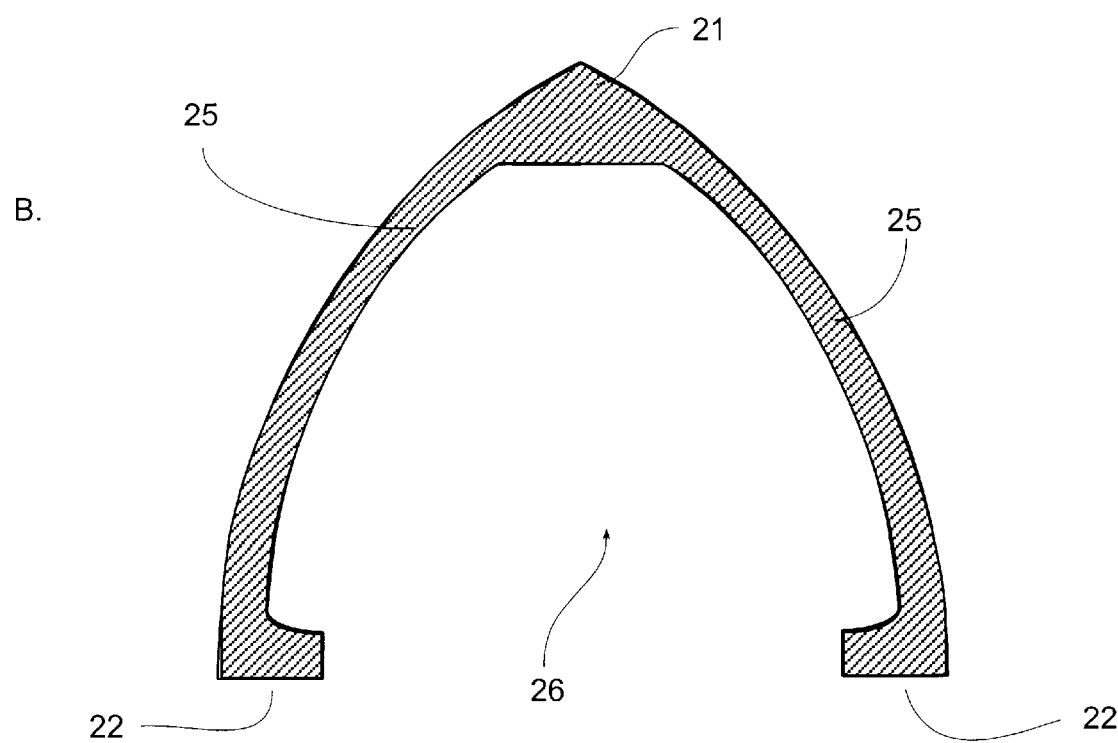

The leading edge 21 of each spoke 20 extends tangentially in a direction opposite the direction of rotation 11 of the wheel (as indicated on FIGS. 1, 2, and 3) from the outer surface 32 of the central hub 30 and mid way between the two outside edges 31. The leading edge also extends perpendicular to the axis of rotation 33 of the central hub and extends to the inner spoke mounting surface 41 of the rim 40. Each of the two trailing edges 22 for each spoke extend tangentially in a direction of rotation of the wheel (as indicated on FIGS. 1, 2, and 3) from the outer surface 32 of the central hub 30 and about opposing the leading edge mounting location on the outer surface 32. Each trailing edge 22 is mounted adjacent to opposing outside edges 31 of the central hub 30. The two trailing edges 22 extend perpendicular to the axis of rotation 33 of the central hub and then gradually arc to a connecting point on the inner spoke mounting surface 41 of the rim 40. The two air deflecting walls 25 extend between the leading edge and each trailing edge. A cross section of a spoke taken along either lines I or II of FIGS. 4b and 5b and about mid way between the rim connecting end 23 and the hub connecting end 24 resembles a "V" and is illustrated in FIGS. 6a–b. The cross section of the spoke reveals a trailing edge cavity 26 positioned between the trailing edges 22 and behind the leading edge 21. FIGS. 6a and 6b illustrate the variations which may be utilized for the spoke cross sections. FIG. 6a illustrates a fuller spoke body 27 with a decreased trailing edge cavity volume 26 while the cross section in FIG. 6b illustrates a more open trailing edge cavity 26. The spoke body may require a fuller design (and heavier) as set forth in FIG. 6a for use of the wheel in rougher terrain and roads while a more open spoke (and lighter in weight) as set forth in FIG. 6b may be utilized for track racing and smoother courses. The hub connecting end of each spoke 24 is preferable radiused to match the curvature of the outside surface of the central hub 32 while the radius is about one half the distance between the outside edges of the hub. The spoke is preferable constructed of continuous material and as a one piece component, manufacturing may be accomplished using known molding techniques, laminating techniques, utilizing light weight composite material such as graphite epoxy and/or KEVLOR™.

Figure 2:
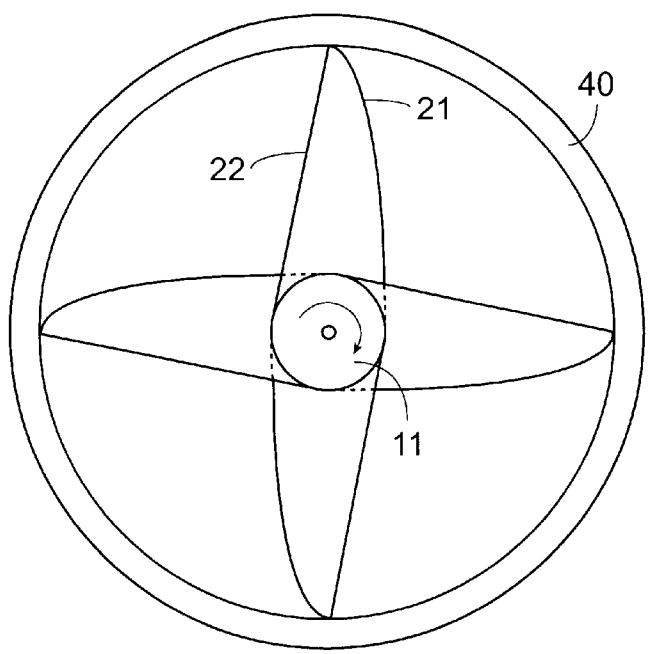
FIG. 2 is a side view of the aerodynamic bicycle wheel with four spokes.
Figure 3:
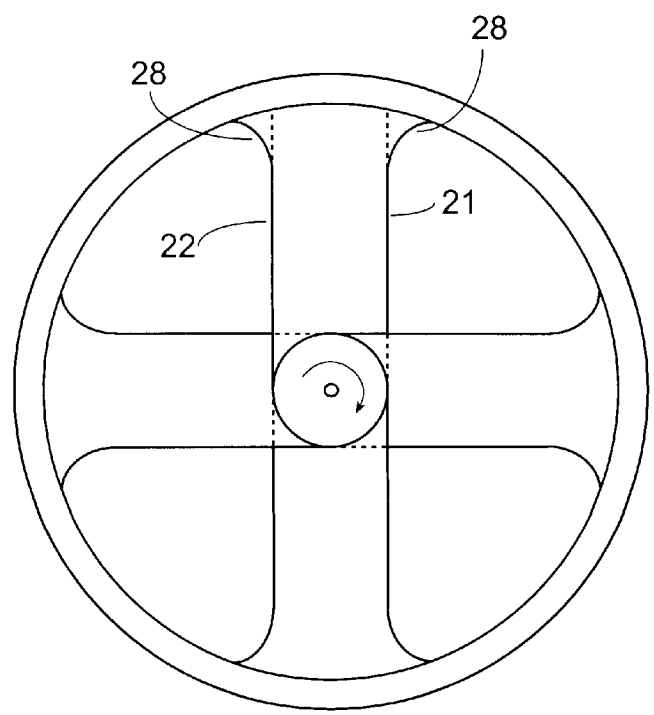
FIG. 3 is a side view of the aerodynamic bicycle wheel with alternatively shaped spokes.

The leading and trailing edge of the spokes may be aligned parallel with a plane along the rotation axis of the central hub as set forth in FIG. 3 and may include an arcing leading edge 21 which gradually arcs to the inner spoke mounting surface 41 of the rim 40 so that the leading edge 21 and both trailing edges 22 meet at a common rim mounting location as set forth in FIGS. 1, 2, and 4a–e. The parallel aligned leading and trailing edges result in the leading edge 21 mounting to the inner spoke mounting surface 41 ahead of the two trailing edges, while each edge may further be arced 28 to spread the loading of forces on the inner surface of the rim. The parallel edges as set forth in FIG. 3 is more suitable for rougher riding since it provides increased rigidity to the wheel but may conversely experience more cross wind influence than the design illustrated in FIG. 2. FIG. 2 spokes are more preferable for smoother riding.

The rim connecting end of the spokes include any number of threaded nipples 29 which extend through the rim and are threadingly secured to the wheel. The number of threaded nipple connectors depends upon the length between the leading edge rim connecting end and trailing edge rim connecting end. In FIG. 5a three threaded nipples are illustrated providing increased connecting strength, while in FIG. 4a one threaded nipple is provided. Other connecting devices for connecting the spoke to the rim may be employed including adhesives, clamps, threaded screws, or by manufacturing the rim and spokes of continuous material.

Efficiency of rotation was determined comparing the present invention with a traditional spoke wheel and recorded in FIGS. 8 and 9. The inventor compared rotational speed for a traditional spoke wheel and an embodiment of the present invention illustrated in FIG. 1 recording the wheel's rotational speed at five second periods while exposed to various wind speeds. Both wheels were mounted to a top of a vehicle and mounted with speed meters and the vehicle brought to a speed indicated on the left column of FIGS. 8 and 9. Each wheel was then manually rotated while traveling at a constant vehicle speed, the wheel rotation speed was recorded in five second periods up to 45 seconds and then finally at 60 seconds. This was repeated for vehicle speeds from 10–40 MPH at 5 MPH increments. As can be seen from the data the present invention performed much better than a traditional spoke bicycle wheel.

It is noted that the embodiment of the Aerodynamic Wheel described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An aerodynamic wheel comprising: a rim with an inner spoke mounting surface and an outer tire mounting area, a central hub with a rotational axis and mounting axle, an outer surface and outside edges, at least three spokes extending between the inner surface of the rim and the outer surface of the central hub, each spoke comprises a leading edge, two trailing edges, a hub connecting end, a rim connecting end, and two air deflecting walls each extending from the leading edge to each trailing edge, the leading edge extends tangentially from the central hub outer surface in a direction opposite a rotational direction of the wheel and perpendicularly from the rotational axis of the central hub and further mounted midway between outside edges of the central hub, the leading edge extends to the rim connecting end, the two trailing edges each extend tangentially from the central hub outer surface in a direction of rotation of the wheel and opposing the leading edge and perpendicular from the axis of the central hub and furthermore each trailing edge is mounted near opposing outside edges of the central hub, the trailing edges extend to the rim connecting end and the leading and trailing edges are parallel with a plane of the rotational axis of the central hub.

2. An aerodynamic wheel comprising: a rim with an inner spoke mounting surface and an outer tire mounting area, a central hub with a rotational axis and mounting axle, an outer surface and outside edges, at least three spokes extending between the inner surface of the rim and the outer surface of the central hub, each spoke comprises a leading edge, two trailing edges, a hub connecting end, a rim connecting end, and two air deflecting walls each extending from the leading edge to each trailing edge, the leading edge extends tangentially from the central hub outer surface in a direction opposite a rotational direction of the wheel and perpendicularly from the rotational axis of the central hub and further mounted midway between outside edges of the central hub, the leading edge extends to the rim connecting end, the two trailing edges each extend tangentially from the central hub outer surface in a direction of rotation of the wheel and opposing the leading edge and perpendicular from the axis of the central hub and furthermore each trailing edge is mounted near opposing outside edges of the central hub, the trailing edges extend to the rim connecting end and the trailing edges are parallel with a plane of the rotational axis of the central hub and the leading edge arcs from the central hub to the rim connecting end so that the trailing edge rim connecting ends and the leading edge rim connecting end are joined.

* * * * *